June 25, 1940.                S. S. MATTHES                2,205,927
ELECTRIC SWITCHING SYSTEM
Filed Oct. 25, 1938
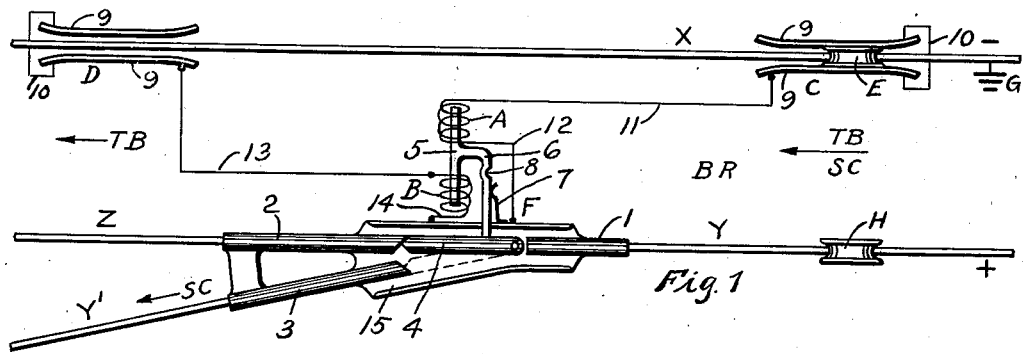
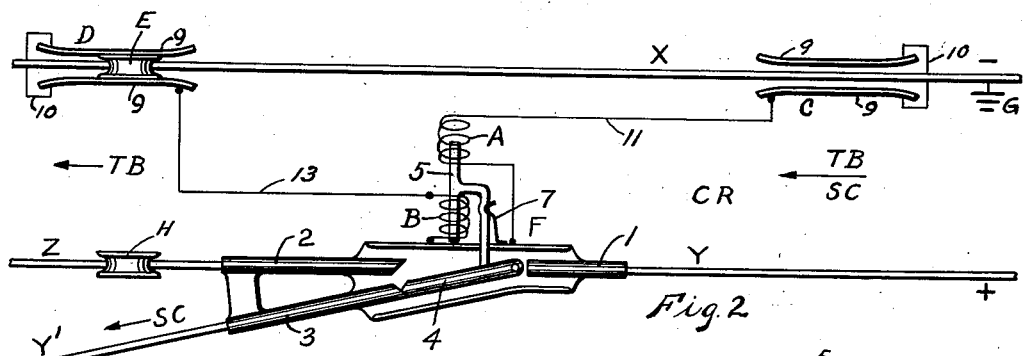
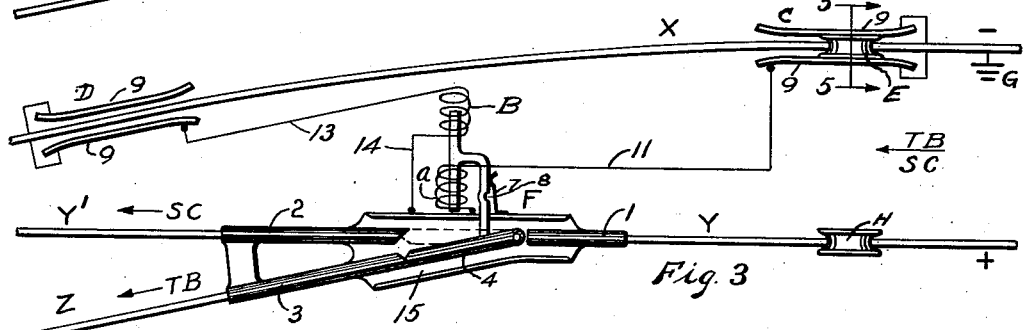
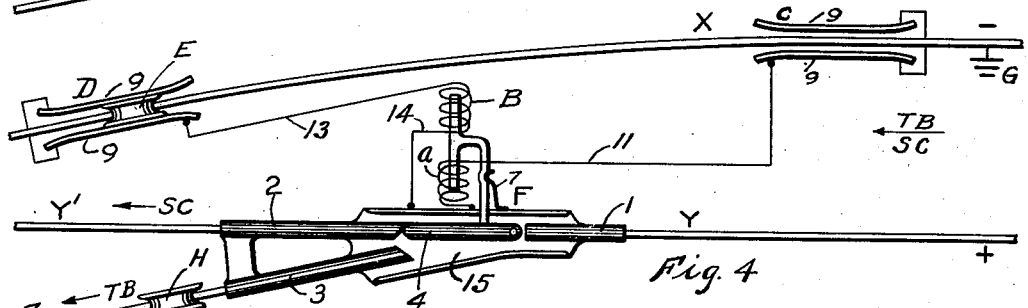
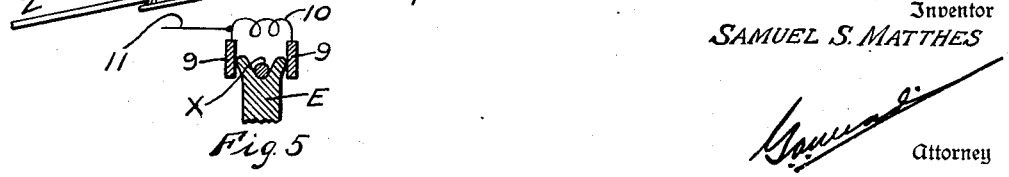
Inventor
SAMUEL S. MATTHES
Attorney Patented June 25, 1940

2,205,927

UNITED STATES PATENT OFFICE 2,205,927

ELECTRIC SWITCHING SYSTEM

Samuel S. Matthes, Mansfield, Ohio, assignor to The Ohio Brass Company, Mansfield, Ohio, a corporation of New Jersey Application October 25, 1938, Serial No. 236,834

9 Claims. (Cl. 191—38)

My invention relates to overhead electrically operated trolley system such as found at turn-outs or branch points.

One object of my invention is to provide a switching system which may be used by either a trolley bus or coach employing two current collectors and by a street car using a single current collector, whereby the collectors on the vehicles may be guided along predetermined paths at a turn-out or branch point.

Another object of my invention is to place the control and operation of the system wholly dependent upon the movement of the passing trolley bus.

Another object is to make the operation of the system entirely automatic, that is, independent of any act upon the part of the vehicle operator.

Still another object of my invention is to provide electrically operated and electrically controlled mechanism to operate the system.

A further object of my invention is to provide a system in which the trolley bus after passing the frog will reset the tongue thereof to that position which will guide the collector on the street car in the direction it is intended to travel in passing through the frog and which is the normal setting of the frog.

Further objects will be apparent to those skilled in the art based upon my disclosure herein.

In the operation of electrically driven vehicles employing overhead conductors, there are at the present time two systems, namely, the trolley bus or coach and the street car, the former, also, referred to as trackless trolley, as it does not follow any fixed path with respect to the trolley wires.

The trolley bus system employs two current collectors and hence two overhead conductors or trolley wires of opposite polarity are required, while the street car system requires only a single overhead trolley wire as it is equipped with a single conductor. The trolley wire used by the street car is preferably of positive polarity, while the ground or track acts as the conductor of opposite or negative polarity.

It is desirable under some circumstances and from the standpoint of economy to arrange the overhead construction such that it will permit combining trolley bus and street car operation moving in the same direction. Under such combined operation one trolley wire, namely, the positive would be common to the operation of the two types of vehicles.

Further under such a combined operation it is desirable to place the control of the overhead switches or frogs at turn-outs and branch points, dependent upon the movement of the trolley bus and entirely independent of the street car.

The frog or switch, which I use in my system, is provided with a movable tongue which is normally set to guide the street car collector along the predetermined path therefor, hence means must be provided for changing the position of the tongue to that required to guide the collector on the bus, upon the bus approaching the frog, and to return the tongue to normal after the bus has passed the frog.

If the control means for the tongue operating mechanism is placed in the common trolley wire in advance of the frog then the tongue will be moved to the same position upon the passing of either the bus or the street car and this will give a false operation for one vehicle unless both are to take the same path and in that case no frog would be required.

My invention will be better understood by reference to the following description taken in conjunction with the accompanying drawing, and particularly pointed out in the claims.

In the drawing:

Fig. 1 is a schematic drawing of a switching system arranged for bus and street car operation, in which a collector on the bus is in engagement with the control mechanism and has set the frog tongue to guide the other collector on the bus along the path it should follow in passing through the frog.

Fig. 2 shows the same schematic arrangement as in Fig. 1, excepting the trolley bus has passed the frog and one collector of the bus is in engagement with a second control means and has returned the frog tongue to its normal position ready to properly guide the collector upon a street car.

Fig. 3 shows a schematic arrangement of my invention in which the trolley wires are arranged for a trolley bus moving around a curve while the street car passes straight through and one collector on the trolley bus is in engagement with the first control device and has set the tongue of the frog in proper position to guide the other collector on the bus.

Fig. 4 shows the schematic arrangement of Fig. 3 in which the trolley bus has passed the frog and one collector on the bus is in engagement with the second control mechanism and moved the frog tongue to its normal or proper position to guide the collector on a street car.

Fig. 5 is a sectional view taken on the line 5—5 of the control device and collector shown in Fig. 3.

In the preferred embodiment of my invention I make use of main conductors X and Y—Z and a branch or third conductor Y'. I have termed the main conductors those upon which the trolley bus operates and the branch or third conductor upon which the street car operates after leaving the main conductor Y.

The same characters are employed in all figures to represent the same elements or parts.

At the junction of the main conductor Y—Z, and the branch conductor Y' is positioned a frog F provided with projecting arms 1, 2, and 3 to which the trolley wires Y, Z, and Y' respectively are attached. The frog is also provided with a tongue 4 movable to either of its two positions to complete a path from the wire Y to the wire Z or from the wire Y to the wire Y'. Electrically operated mechanism is used to move the tongue 4 and this mechanism is provided with coils A and B which act upon the reciprocating plunger 5 which moves the arm 6 in unison therewith and the tongue 4 to which the arm 6 is attached.

The coil A when energized attracts the plunger and moves the tongue to the position shown in Figs. 1 and 3 while the coil B when energized attracts the plunger 5 and the tongue 4 is moved to the position shown in Figs. 2 and 4.

In order to yieldingly retain the tongue 4 in its normal position as shown in Figs. 2 and 4, a spring 7 cooperates with a slight notch 8 in the arm 6. This holding spring 7 prevents the tongue being accidentally moved from its normal position after it has been thus set by a passing trolley bus or during the passage therethrough of the current collector on the street car.

In order to properly energize and control the energization of the coils A and B, I make use of contacts C and D which are associated with the negative trolley wire X and are arranged to be engaged by a current collector E on the trolley bus.

The contacts C and D may be of various constructions, as for instance, it may consist of side contact bars 9 preferably of copper electrically connected together by means of a conductor 10 and adapted to be engaged by the passing current collector E on the bus which will simultaneously engage the trolley wire X, thus electrically connecting the contact bars 9 with the trolley wire X.

The coil A is connected to the contact C through the conductor 11 and to the frog F through the conductor 12. The coil B is connected to the contact D through the conductor 13 and to the frog F through the conductor 14.

It will be evident that when the contact C is engaged by the collector E that the metal bars 9 will be directly connected to the trolley wire X through the collector E and since the frog F is directly connected to the trolley wire Y—Z that the coil A will be energized and the tongue 4 moved to the positions shown in Figs. 1 and 3. Similarly when the contact D is engaged by the collector E, the coil B will be energized and the tongue 4 moved to the position shown in Figs. 2 and 4.

In the operation of my system, referring to Fig. 2, it will be evident that a current collector mounted on a street car moving along the wire Y in the direction of the arrow marked TB—SC will be guided by the tongue 4 from the arm 1 to the arm 3 and thence onto the branch wire Y'. Likewise the current collector on a street car moving along the same path in the opposite direction will be guided from the wire Y' along the arm 3, tongue 4, arm 1, and onto the wire Y. However, the operation of the street car in this latter direction might interfere with a trolley bus moving in the direction of the arrow TB—SC and therefore may not be practical.

In case of the trolley bus moving in the direction of the arrow TB—SC, when its collector E engages the contact C and the same is energized, the coil A will be energized and will operate the tongue 4 to the position shown in Figs. 1 and 3, overcoming the tension of the spring 7. As the bus advances passing the frog, the collector H of the bus will be guided from the arm 1 to the arm 2 by the tongue 4 and as the bus still further advances the collector E of the bus will engage with the contact D as shown in Figs. 2 and 4 thus connecting the contact D with the trolley wire X and energizing the coil B, thus moving the tongue 4 to the position shown in Figs. 2 and 4 which is the normal setting of the tongue 4.

It will be evident that after resetting the tongue 4 to the position shown in Fig. 2 that a second trolley bus may immediately follow the first and the aforesaid operation will be repeated, or the trolley bus may be immediately followed by a street car in which case the tongue 4 is not moved from its normal position. In either case however the current collectors will be guided along their predetermined path through the frog.

It is not necessary to have the arm 6 notched to receive the spring holder 7, while the tongue is in the position shown in Fig. 1, although the spring holder 7 may be arranged to yieldingly retain the tongue in both positions if desired.

It will be evident that in Figs. 3 and 4 the wires X and Y' must be insulated from each other at their point of intersection (not shown) to prevent connecting the two polarities.

It will, also, be evident that the operating coils A and B instead of being directly associated with the frog pan 15 may be mounted directly opposite upon the wire X but insulated therefrom and the arm 6 lengthened sufficiently to span the gap between the wire X and the tongue 4.

The negative wire is shown as grounded at G, although this grounding would probably take place at the source of current supply.

It will also be evident that if the contact D is associated with the trolley wire Z at a point just opposite to its present position and the coil B connected to the contact D and to the wire X that the operation of the system will be the same as above described except the collector H will engage the contact D in place of the collector E.

Modifications no doubt will suggest themselves to those skilled in the art based upon my disclosure herein, therefore, I wish to be limited only by my claims.

I claim:

1. In an overhead trolley system for operating trolley buses using two current collectors and street cars using one current collector in combination, a positive and a negative trolley wire, one wire grounded, an overhead frog provided with a movable tongue associated with the positive wire, a branch wire leading from the frog, the tongue adapted to guide a current collector of either the bus or the street car along separate predetermined paths while passing across the frog, electrically operated mechanism associated with the frog to move the tongue to either its straight through position or to its branch position, means to yieldingly hold the tongue in a predetermined position, electrical contacts associated with the negative wire and to be engaged and energized only by a current collector on a passing bus to control the operation of the electrically operated mechanism, the contacts being so connected to the said mechanism and being so positioned relative to the frog that one contact is engaged prior to the engaging current collector passing the frog and the other contact being engaged after the collector passes the frog whereby the engagement of the aforesaid bus collector with the leading contact moves the tongue to guide the other bus collector across the frog in the path it should take and moves the tongue to the position to guide the collector on the street car across the frog in the path it should take when the bus collector engages the other contact, the system operating automatically when the bus collector engages either contact and independent of any act by the vehicle operators.

2. In an overhead trolley system for operating trolley buses using two current collectors and street cars using one current collector, in combination, a positive and a negative trolley wire, one wire grounded, an overhead frog provided with a movable tongue associated with the positive wire, a branch wire leading from the frog, the tongue adapted to guide a current collector of either the bus or the street car along separate predetermined paths while passing across the frog, electrically operated mechanism associated with the frog to move the tongue to either its straight through position or to its branch position, electrical contacts associated with the negative wire and to be engaged and energized only by a current collector on a passing bus to control the operation of the electrically operated mechanism, the contacts being so connected to the said mechanism and being so positioned relative to the frog that one contact is engaged prior to the engaging current collector passing the frog and the other contact being engaged after the collector passes the frog whereby the engagement of the aforesaid bus collector with the leading contact moves the tongue to guide the other bus collector across the frog in the path it should take and moves the tongue to the position to guide the collector on the street car across the frog in the path it should take when the bus collector engages the other contact.

3. A trolley system comprising a pair of main overhead wires, one a grounded negative wire and the other an ungrounded positive wire and a branch wire from the positive wire, whereby a trolley bus provided with two current collectors may operate with respect to the main wires and a street car provided with a single current collector may operate with respect to the positive main wire and the branch wire, a frog located at the junction of the main and the branch wires, a movable tongue to guide a current collector on the bus and the current collector on the street car along predetermined paths in crossing the frog, electrically operated mechanism provided with two coils for moving the tongue to either of its positions when the coils are separately energized, a contact device associated with the negative wire and so positioned as to be engaged only by a collector on the bus before the other collector on the bus engages the said tongue to energize one coil of the mechanism and automatically effect a movement of the tongue to a predetermined position to guide the said other bus collector through the frog, a contact device associated with the negative wire and so positioned as to be engaged only by a collector on the bus after the other collector on the bus has passed the tongue to energize the other coil of the mechanism and automatically effect a movement of the tongue to its other position to guide the collector on the street car across the frog in a predetermined path, the system operating independently of the vehicle operators.

4. An overhead trolley system comprising a positive and a grounded negative main trolley wires insulated from each other for operating a trolley bus and the positive wire adapted for operating a street car and a single branch wire from the positive wire, a frog associated with the branch and main wire at their junction and having a tongue movable to two positions to guide a current collector along either the main wire or onto the branch wire, electrically operated mechanism to move the tongue and having two coils for positioning the tongue to either of its positions depending upon which coil is energized, contact means to which the coils are electrically connected positioned in the negative main wire to be engaged by one of the passing current collectors on the bus whereby the mechanism is energized only when the contact means is engaged by a current collector on the bus to first position the tongue in the path to be taken by the bus and to then position the tongue in the path to be taken by the street car after the bus has passed the frog the system operating entirely independent of the vehicle operator.

5. An overhead trolley system comprising two main trolley wires insulated from each other for operating a trolley bus and one of the wires adapted for operating a street car and a single branch wire from one of the main wires, a frog associated with the branch and main wire at their junction and having a tongue movable to two positions to guide a current collector along either the main wire or onto the branch wire, electrically operated mechanism to move the tongue and having two coils for positioning the tongue to either of its positions depending upon which coil is energized, contact means to which the coils are electrically connected positioned in the other main wire to be engaged by one of the passing current collectors on the bus whereby the mechanism is automatically energized only when the contact means is engaged by a current collector on the bus to first position the tongue in the path to be taken by the bus and to then position the tongue in the path to be taken by the street car after the bus has passed the frog, the system operating entirely independent of the vehicle operators.

6. An overhead trolley system comprising, a two wire system for operation of a trolley bus and a single wire system consisting of one of the said wires for operation of a street car, a branch wire from only one of the aforesaid wires, a frog at the junction formed thereby and having a movable tongue to guide current collectors on the bus and street car in predetermined separate paths while crossing the frog, a solenoid provided with a pair of coils associated with one of the trolley wires and arranged to move the tongue to either of its positions, and means associated with the other trolley wire opposite the frog and electrically connected to the said coils to automatically and independently of the vehicle operators control the energization of the coils when the means is engaged by a current collector on a passing bus.

7. In an overhead switching system for use with a trolley bus having two current collectors mounted on the bus and a street car having one collector mounted thereon, a pair of trolley wires of opposite polarity of which one wire is common for the operation of both vehicles and the other wire is for the operation only of the trolley bus, a third trolley wire leading to and from the common wire, a trolley frog at the junction of the common and third wires to guide one of the current collectors on the bus along the common wire and to guide the collector on the street car along the third wire, the frog provided with a movable tongue forming a guide for the collectors passing therethrough, electrically operated mechanism for the tongue, the mechanism including a pair of coils for moving the tongue in opposite directions, control means for one coil comprising a contact device associated with aforesaid other wire to be automatically and electrically connected to the trolley wire by the passage therethrough of a collector on the bus, the said contact device being so constructed and positioned relative to the frog and the connections between said device and the last mentioned coil and the trolley wires being such that the said last mentioned coil and the contact device will be connected in series with the trolley wires as one of the current collectors on the trolley bus passes through the contact device whereupon the last mentioned coil will be energized and the frog tongue moved to that position which will guide the other collector on the bus along a predetermined path parallel to the path of the first said collector on the bus, and means electrically connected in series with the trolley wires to energize the other coil of said mechanism after the collector on the bus has passed through the frog to move the tongue to the other position whereby the collector on the street car will be guided along a predetermined path different from that of the bus collector, the frog tongue being movable only by the electrically operated mechanism including the contact device when energized by the passing of the trolley bus independently of the vehicle operators.

8. An overhead trolley system comprising, two overhead trolley wires of opposite polarity for operation of a trolley bus and a street car, one wire being common to the operation of both vehicles, a frog associated with the aforesaid common wire and a trolley wire leading from the frog at an angle to the last said wire, the frog provided with a pivoted tongue to guide a current collector on the vehicles through the frog in either of two predetermined paths, electrically operated mechanism arranged when energized to move the tongue to either of its positions, contact means to control the energization of the said mechanism, the contact means being so constructed and positioned with respect to each other and to the non-common wire and so connected with respect to the said mechanism and the trolley wires that the contact means will be automatically connected electrically to the non-common trolley wire by a passing current collector on the trolley bus only, whereby the said mechanism will be energized to operate the tongue first to its position to guide the collector on the bus along its predetermined path and then to its position to guide the collector on the street car along its predetermined path, the said system being non-controllable by either bus or street car operator.

9. In an overhead trolley system comprising two trolley wires of opposite polarity for operation of a trolley bus and a branch wire from one trolley wire for operation of a street car therealong and a trolley switch located at the junction of the branch and its trolley wire and the said one trolley wire being common for the operation of the trolley bus and street car to the point where the switch is located, the switch provided with a tongue operable to guide one of the trolley bus current collectors straight through the switch relative to the common trolley wire and to guide the current collector on the street car on to the branch wire and electrically operated means associated with the switch tongue to adjust the position of the tongue, the combination with the non-common trolley wire and engageable only by a current collector on the bus of means to energize the electrically operated means to automatically set the switch tongue to its straight through position before the current collector on the bus reaches the switch and to automatically set the switch to the branch position after the current collector on the bus has passed through the switch, the operation of the system being entirely independent of action upon the part of the operator of either vehicle other than merely operating the vehicle in the predetermined direction of movement.

SAMUEL S. MATTHES.